(No Model.)
W. H. CHAPIN.
ELASTIC TIRED WHEEL.
No. 323,635. Patented Aug. 4, 1885.
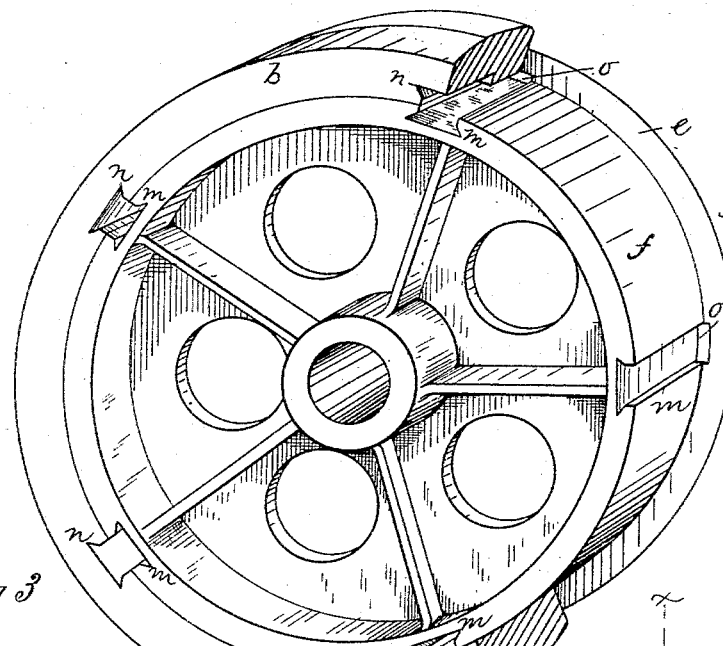
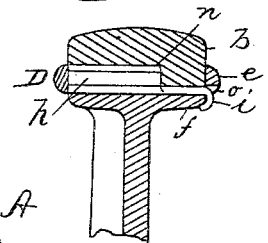
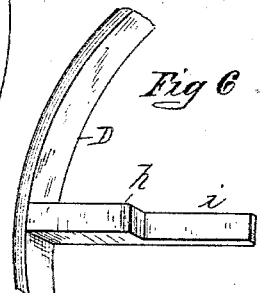
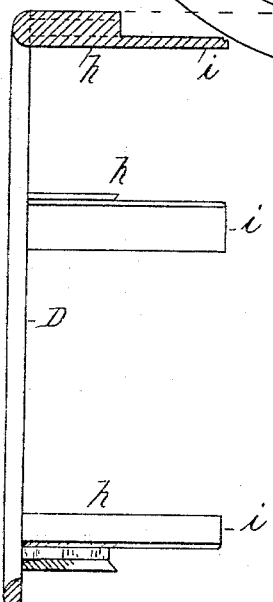
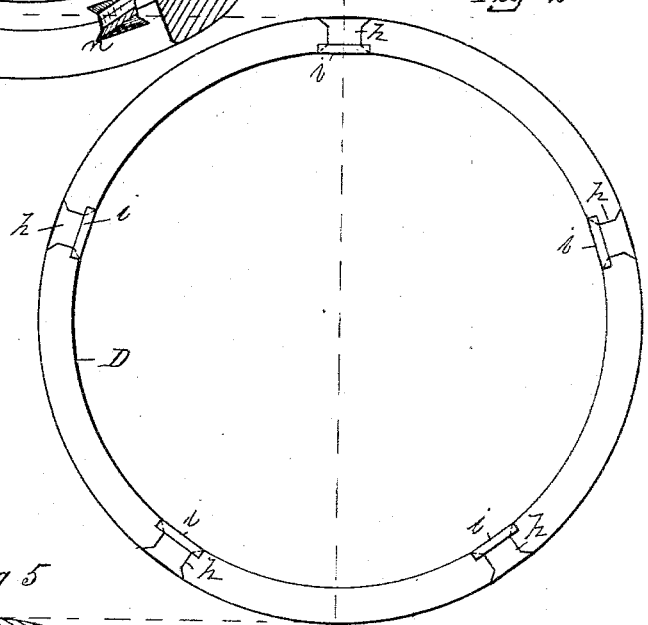
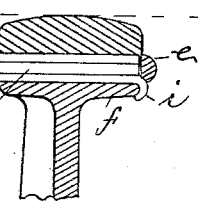
WITNESSES:
Charles Bill
S. A. Bemis
INVENTOR
Wm H Chapin
BY
Henry A Chapin
ATTORNEY
N. PETERS, Photo-Lithographer, Washington, D. C.

UNITED STATES PATENT OFFICE.

WILLIAM H. CHAPIN, OF SPRINGFIELD, MASSACHUSETTS.

ELASTIC-TIRED WHEEL.

SPECIFICATION forming part of Letters Patent No. 323,635, dated August 4, 1885.

Application filed June 29, 1885. (No model.)

*To all whom it may concern:*

Be it known that I, WM. H. CHAPIN, a citizen of the United States, residing at Springfield, in the county of Hampden and State of Massachusetts, have invented new and useful Improvements in Elastic-Tired Wheels, of which the following is a specification.

This invention relates to improvements in rubber-tired wheels, the object being to provide improved means for attaching a rubber or elastic tire to the rim of a metallic or other wheel.

In the drawings forming part of this specification, Figure 1 is a perspective view of a wheel and of a portion of a tire, and Figs. 2 and 3 are respectively a plan and a sectional view of a tire-fastening ring adapted to fit said wheel, said three figures illustrating a wheel-construction embodying my invention. Fig. 4 is a transverse section through the wheel rim and the tire. Fig. 5 is a like view to Fig. 4, but showing a slightly-modified construction of the tire-fastening devices. Fig. 6 is a section of the tire-fastening ring with one of its arms thereon, showing the latter in a slightly modified form.

This invention is somewhat in the nature of an improvement upon Patent No. 319,844, dated June 9, 1885, to which reference may be had.

In the drawings, A is the wheel upon which the tire $b$, of rubber, preferably is secured. The wheel is made of cast iron or other suitable material.

D is a ring adapted in form to correspond with that of a fixed flange, $e$, on one edge of the rim $f$ of the wheel, and having arms $h$ thereon integral therewith or rigidly secured thereto, standing at right angles to the plane of the inner face of the ring. Said arms $h$ have thin extremities $i$, and their thick portions adjoining the ring are of dovetail form, as shown, to adapt them to enter correspondingly-shaped grooves in the tire and wheel-rim, and are shorter than the width of the latter, as hereinafter explained.

The wheel A has a series of transverse undercut or dovetail-formed grooves, $m$, in its rim $f$, and its flange $e$ is continuous, and has openings $o$ through it at the ends of said grooves.

The tire $b$ has formed in its inner side, or in that which comes in contact with the wheel-rim $f$, transverse grooves $n$, corresponding in form to the said grooves $m$ in the wheel-rim, and so located in the tire that when the latter is placed on the wheel said grooves $m$ and $n$ form jointly a dovetail-shaped socket or chamber having the form of a cross-section of the thick portion of one of the arms $h$ on ring D. The grooves $n$ in the tire $b$, as shown in Figs. 1 and 4, extend only partially across the latter, or as far as the thick part of the arm $h$ reaches.

In assembling the above-described parts of the wheel to complete the latter, the tire $b$ is placed on the wheel in the position shown in Fig. 1, one edge thereof bearing against the flange $e$. The ring D is then placed on the wheel by passing its arms $h$ through the double dovetail-grooved sockets formed by the grooves $m$ and $n$, above described, causing the thin ends of said arms to pass through the openings $o$ in the flange $e$, and project beyond the latter. The ring D is then forced against the tire $b$, to suitably compress the latter between the ring and the flange $e$, and the thin ends $i$ of the arms $h$ are bent over the edge of the rim $f$, as shown in Fig. 4, firmly locking the ring to the wheel. Said ring is made of wrought or cast malleable iron, or of other suitable metal. Thus by the interlocking of the arms $h$ with the tire and the wheel the tire is by the arms secured against any circular movement on the wheel, and by the same means is firmly locked to the rim thereof, and its location between the rim D and the flange $e$ prevents any lateral motion. A worn-out tire is easily replaced by removing the ring D and the old tire and replacing it with a new one, as above described.

The above-described construction obviates making a ring and a series of separate keys for securing the tire to the wheel, and the necessity of making a tire with dovetail projections on its inside, as described in said patent, said tire as there constructed being of necessity considerably heavier than in the construction herein shown. The said keys of said patent served but one purpose—namely, to lock the tire laterally—while the arms $h$ on ring D serve also the purpose of said keys, and, besides that, the purpose of the special dovetail grooves in the wheel of said patent and the above-named projections on the rubber tire, which engage with said grooves, thus essentially simplifying the construction of the wheel without in the least impairing its efficiency.

In constructing wheels of such diameter that it might be inconvenient to cast the ring D therefor the latter may be made in sections, to which the arms *h* are attached.

The preferable construction of the grooves *m* and *n* in the wheel and the tire and the arms *h* is that above described; but they may be modified, as shown in Figs. 5 and 6. In the former the thick part of the arm *h* extends quite across between the tire and the wheel-rim, having thereon the said thin end *i*, to be bent over the edge of the rim, as described. In the latter figure the arm *h* is shown of the same general form as that in Figs. 3 and 4, but not having dovetail projections thereon. The arm of Fig. 6 serves equally well for locking the tire laterally and for preventing any circular motion on the wheel, but does not engage with it to prevent it from moving away from the face of the rim, as does the arm shown in Figs. 3 and 4. It is obvious that when the arm of the shape shown in Fig. 6 is used the grooves in the wheel and tire will be made of corresponding form.

It is obvious that to make the ring D with arms thereon available for securing the tire *b* on a wheel, as aforesaid with reference to the lateral compressibility of the tire between the ring and the flange of the wheel, it is only requisite that space be made either in the wheel-rim or in the tire, or in both, to allow the arms *h* to pass between the tire and the rim without distorting the latter, and the ends of the arms be bent over the edge of the rim, as above described. To this end the arms *h* may be made thin for their whole length, instead of for a portion of it, as shown, and shallow grooves made in either the rim or tire to let them pass between the two, as described.

What I claim as my invention is—

1. In an elastic-tired wheel, a wheel having a continuous flange on one edge of its rim projecting outwardly at right angles to the face of the rim, a series of transverse undercut grooves in the latter terminating at openings through said flange, an elastic tire having a series of undercut transverse grooves in its inner side corresponding in position to those in said wheel-rim, and a ring to bear against one edge of the tire, having arms of dovetail form fixed thereon to pass between and engage with said tire and rim, whose ends engage with one edge of the latter, all combined substantially as set forth.

2. In an elastic-tired wheel, a wheel having a continuous flange on one edge of its rim projecting at right angles to the face of the rim, a series of transverse grooves in the latter terminating at openings through said flange, an elastic tire having a series of transverse grooves in its inner side corresponding in position to those in said wheel-rim, and a ring to bear against one edge of the tire, having arms fixed thereon to pass between and engage with said tire and rim, whose ends engage with one edge of the latter, all combined substantially as set forth.

3. The combination, with a wheel having a rim and an upwardly-projecting flange on one edge thereof, of an elastic tire fitting said rim, and of a ring secured against one edge of the tire by arms rigidly attached to said ring and extending between said rim and tire, and having their ends engaged with the edge of said rim, substantially as set forth.

WM. H. CHAPIN.

Witnesses:
CHAS. BILL,
S. A. BEMIS.